(12) United States Patent
Schweid

(10) Patent No.: US 9,300,842 B1
(45) Date of Patent: Mar. 29, 2016

(54) GATED EDGE ENHANCEMENT USING ORTHOGONAL RATIONAL COUNTERS

(71) Applicant: Xerox Corporation, Norwalk, CT (US)

(72) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/571,441

(22) Filed: Dec. 16, 2014

(51) Int. Cl.
*H04N 1/409* (2006.01)
*G06K 5/00* (2006.01)
*G06K 7/00* (2006.01)
*H04N 1/405* (2006.01)
*G06T 7/00* (2006.01)

(52) U.S. Cl.
CPC ............ *H04N 1/4092* (2013.01); *G06T 7/0085* (2013.01); *H04N 1/405* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,596,684 A * | 1/1997 | Ogletree | G06K 15/00 345/611 |
| 5,684,293 A | 11/1997 | Kessler | |
| 5,903,276 A | 5/1999 | Shiraishi | |
| 6,115,050 A | 9/2000 | Landau et al. | |
| 6,144,461 A | 11/2000 | Crean et al. | |
| 6,243,499 B1 | 6/2001 | Loce et al. | |
| 7,295,346 B2 * | 11/2007 | Loce | H04N 1/409 358/1.9 |
| 7,518,618 B2 * | 4/2009 | Loce | G06T 11/203 345/596 |
| 7,565,015 B2 | 7/2009 | Loce et al. | |
| 7,755,638 B2 | 7/2010 | Loce et al. | |
| 8,467,089 B2 * | 6/2013 | Loce | G06K 15/02 358/1.9 |
| 8,515,161 B2 | 8/2013 | O'Neill et al. | |
| 8,565,548 B2 | 10/2013 | Washio | |
| 8,730,258 B1 | 5/2014 | Cornell | |
| 8,971,658 B2 * | 3/2015 | Lin | H04N 1/58 345/549 |

* cited by examiner

*Primary Examiner* — Scott A Rogers
(74) *Attorney, Agent, or Firm* — Kermit D. Lopez; Luis M. Ortiz; Ortiz & Lopez, PLLC

(57) ABSTRACT

Methods and systems for determining an edge pixel as a function of both the local video and the spatial location. Several logical gating functions, which are solely mappings of image position, are generated. Edges are marked only at locations where the gating function is true (e.g., or active) and not at other image locations. In order for a pixel to be tagged as an edge pixel, both its surrounding pixels values must be detected as an edge and the gating function must be active. Each gate output can be determined by employing either the image pixel count or the image scanline count. Different gating functions can be associated with different edge types to ensure the edge modulation pattern occurs orthogonal to the edge direction.

20 Claims, 7 Drawing Sheets

GATED EDGE ENHANCEMENT USING ORTHOGONAL RATIONAL COUNTERS

TECHNICAL FIELD

Embodiments are generally related to the digital processing of image data. Embodiments are additionally related to edge detection in digital image processing.

BACKGROUND OF THE INVENTION

An edge within an image is a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

Two key properties of an edge are strength and orientation. Edge strength is a measure of the contrast of an edge. A black typographic character on a white background produces stronger edges than a gray character on a white background. Edge orientation can be described by a variety of measures, such as angle quantified in degrees or by classes such as vertical, horizontal, and diagonal.

In order to produce crisp text and graphics, current xerographic printers detect text and line edge and render them differently than by applying the standard line or clustered dot screen. Significant previous art exists for algorithms of detecting text and line art edge. One common term for this family of methods is anti-aliased tagging (AAT). This technology, which is a detection methodology, is used in conjunction with a rendering technology. In other words, the halftoning method applied to edges detected from AAT differs from the normal method applied to the rest of the image or document. The unique edge based halftoning method applied to the edges is similarly referred to as anti-aliased rendering (AAR). In high addressable systems—systems where the number of output pixels (or locations) is a multiple greater than 1 of the input pixels—the edge pixels might be generated using either a LUT (predefined mapping) or a localized screen.

FIG. 1 illustrates a schematic diagram of a prior art example of an input image 12 at 600 spi, a tagged image 14, and the possible resulting output image 16 at 1200×1200 using AAT and AAR. The input image 12 is a segment of a black line (on the right) in the white background. Although not shown, the line is a vertical line that continues above and below the shown context. The input image 12 has a gray boundary between the white and black areas. The AAT algorithm detects the gray pixels as edge pixels aligned left-right with the dark side on the right. The AAT renderer then created a 2×2 binary output for each gray pixel where the two left pixels are white and the two right pixels are black. This results in text that effectively appears to be created at the output resolution of 1200 with an input "gray" resolution of 600 spi. Although not shown here, the AAT and AAR paradigm is also effectively used to outline gray text to significantly improve apparent edge sharpness.

There are two major problems with this aforementioned method. The first is that in some xerographic systems the response to character outlining is highly non-linear. For an edge pixel turning on only one subpixel of a 2×2 output pixel may barely outline while turning on two of the subpixels may create an outline that is overly dark. It is therefore hard to control the edge outline strength accurately in these systems. Additionally, at such small scales the response from engine to engine may differ significantly making the method non-repeatable over a fleet of printers. Furthermore, the current AAT method is only useful in systems that are high addressable. If there are no subpixels to manipulate, the current method has only binary control over a character outline—either it is on or off everywhere. This precludes use of AAT/AAR in inkjet based devices where the output image resolution is identical to the input image RIP resolution. It would be useful to maintain the current benefits of AAT by extension and require significant redesign of the basic approach.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for the digital processing of image data.

It is another aspect of the disclosed embodiments to provide for improved edged detection in digital image processing.

It is yet another aspect of the disclosed embodiments to provide for methods and systems for gated edge enhancement using orthogonal rational counters.

It is a further aspect of the disclosed embodiments to provide for methods and systems for determining an edge pixel as a function of both local video and spatial location.

The aforementioned aspects and other objectives and advantages can now be achieved as described herein. Methods and systems are disclosed for determining an edge pixel as a function of both the local video and the spatial location. Several logical gating functions, which are solely mappings of image position, are generated. Edges are allowed to be marked only at locations where the gating function is true (or active) and not at other image locations. In order for a pixel to be tagged as an edge pixel, both its surrounding pixels values must be detected as edge and the gating function must be active. Each gate output can be determined by employing either the image pixel count or the image scanline count. Different gating functions can be associated with different edge types to ensure the edge modulation pattern occurs orthogonal to the edge direction.

In one embodiment, a method can be implemented for gated edge enhancement. Such a method can include, for example, steps or logical operations for generating a plurality of gating functions comprising mappings with respect to a position of an image; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determines an edge pixel as a function of both the video and a spatial location.

In another embodiment, determining each gate output with respect to the gating function(s) can further include steps or logical operations for determining each gate output with respect to the gating function(s) using an image pixel count.

In still another embodiment, determining each gate output with respect to the gating function(s) can further involve steps or logical operations for determining each gate output with respect to the gating function(s) using an image scanline count.

In yet another embodiment, associating varying gating functions among the gating functions with different edge types can further involve steps or logical operations for associating horizontal gradients with scanline count gating functions among the gating functions; and associating vertical gradients with pixel count gating functions among the gating functions.

In some embodiments, a step or logical operation can be provided for controlling outline strength with respect to the image via dithering proportions. In other embodiments, a step or logical operation can be implemented for correcting native asymmetry with respect to the image utilizing varying dithering proportions. In another embodiment, a step or logical operation can be provided for capturing the image prior to generating the gating functions comprising mappings with respect to the position of the image. In still another embodiment, a step or logical operation can be implemented for rendering the image via an image-rendering device. In yet another embodiment, a step or logical operation can be implemented for providing a gating function logic with respect to the gating function, wherein the gating function logic is programmable to be active with any rational duty cycle. In yet another embodiment, the gating function can be, for example, a stochastic gating function created via a random number generator and a threshold level to determine an active state in place of the rational duty cycle.

In another embodiment, a system for gated edge enhancement can be implemented. Such a system can include, for example, at least one processor; and a computer-usable medium embodying computer program code, the computer-usable medium capable of communicating with the processor(s), the computer program code comprising instructions executable by the processor(s) and configured, for example, for: generating a plurality of gating functions comprising mappings with respect to a position of an image; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determine an edge pixel as a function of both the video and a spatial location.

In another embodiment, a system for gated edge enhancement can be implemented, which includes, for example, an image-capturing unit; at least one processor that communicates with the image-capturing unit; and a computer-usable medium embodying computer program code, the computer-usable medium capable of communicating with the processor(s). The computer program code can include instructions executable by the processor(s) and configured for: generating a plurality of gating functions comprising mappings with respect to a position of an image captured by the image-capturing unit; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determine an edge pixel as a function of both the video and a spatial location.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
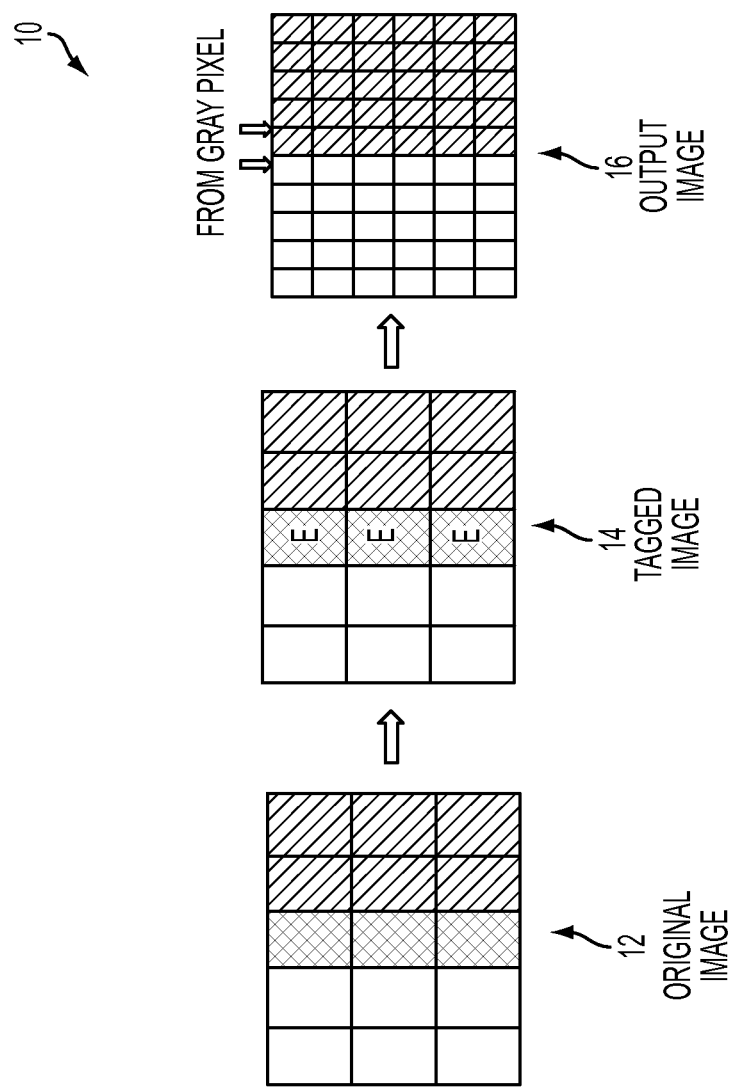
FIG. 1 illustrates a schematic diagram of a prior art example of an input image, a tagged image, and a possible resulting output image.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is considered to be in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, where each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Figure 2:
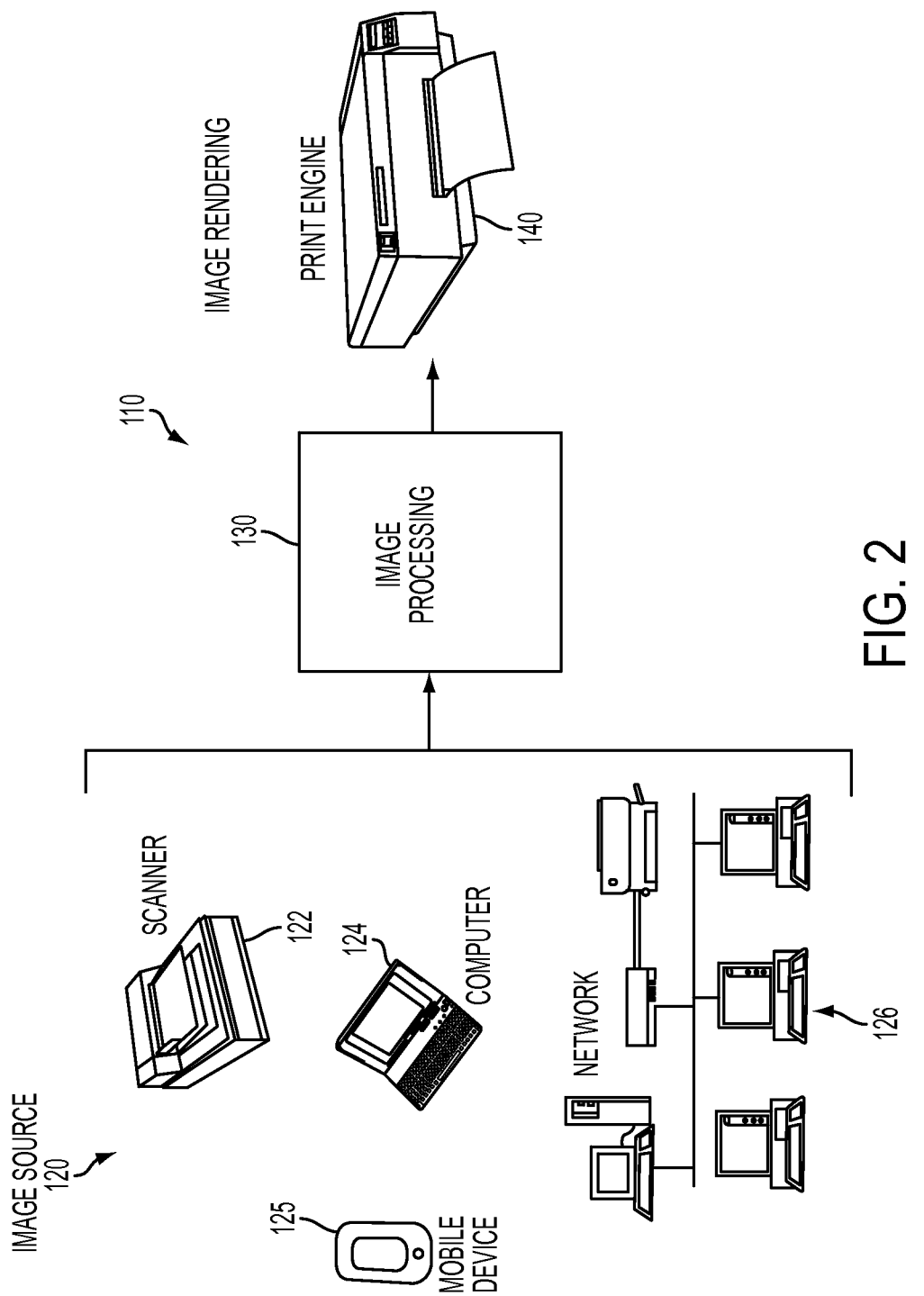
FIG. 2 is a general representation of a suitable system-level embodiment for one or more aspects of the teachings presented herein.

Turning now to FIG. 2, a schematic diagram of a digital imaging system suitable for one or more aspects of the disclosed embodiments is illustrated. In system 110, an image source 120 can be employed to generate image data that is supplied to an image processing system 130, and which produces output data for rendering by print engine 140. Image source 120 may include, for example, a scanner 122, a computer 124, a mobile computing device 125 (e.g., a Smartphone, tablet computing device, etc.), and a network 126 or any similar or equivalent image input terminal. In some embodiments, image source 120 may be an MFD (Multi-Function Device) that scans, copies, and prints documents. In other embodiments, image source 120 may be, for example, a photocopy machine.

On the output end, printer engine 140 is a bi-level printing device, such as a xerographic engine; print engine 140, however, may include such equivalent print technology alternatives as laser jet, ink jet, etc. The teachings presented herein are directed toward aspects of image processor 130 (e.g., an image processing module) depicted in FIG. 2. In particular, the intention of the teachings presented herein is to identify, and process accordingly, edge pixels within a digital image. It will be appreciated by those skilled in the art that the rendering of an image into a printable or displayable output format may be accomplished at any of a number of locations, which herein is provided for in but one example, as only occurring within the image processing system 130 or within in the print engine 140. Note that the print engine 140 can be implemented as a stand alone printer, photocopy machine, or MFD, and so forth, which communicates with, for example, the network 126, computer 124, mobile computing device 125, scanner 122, and so on.

Figures 3, 4:
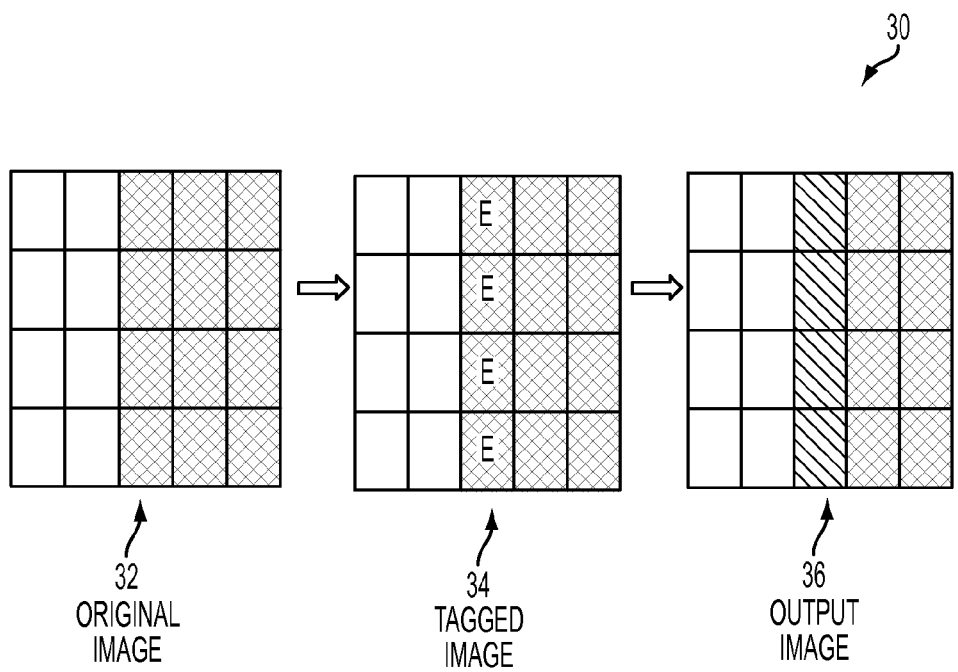
FIG. 3 illustrates a schematic diagram of an original image, a tagged image, and a resulting output image in a non-high addressable system, in accordance with a preferred embodiment.
FIG. 4 illustrates a diagram of a simple gating function that permits edges on every other scanline every other pixel, in accordance with a preferred embodiment.

FIG. 3 illustrates a schematic diagram of an original image 32, a tagged image 34, and a resulting output image 36 in a non-high addressable system 30, in accordance with a preferred embodiment. The disclosed approach involves the creation of a gate function that can be applied to the anti-aliased tagging (ATT) approach discussed earner. Currently, the decision of tagging a pixel as an edge (and using AAR screening to render it to binary) is solely a function of the neighborhood gray values of the pixel and the current tag of the pixel itself. Regardless of where that grey neighborhood occurs, the tagging is always the same as shown in, for example, the tagged image 14 depicted in FIG. 1. In the tagged image 14 of FIG. 1, the gray pixels are marked as edges (E) all along the horizontal edge and this result would occur at all locations on the page. In the case of a saturated edge in the tagged image 14, this is suitable, but it is not desirable for gray edge in a system with high addressability and not acceptable in systems without high addressability.

As an example, consider a gray edge in the non-high addressable system 30 depicted in FIG. 3. The resultant output image 36 would have a strong outline that is black as it would be rendered by the outline screen while the interior of the line or character is gray that is rendered by the halftoner (e.g., blue noise screen). This is often perceived as being too strongly outlined and is typically considered objectionable.

A gating function can control the tagging of edges. Such a gating function acts as a control to permit or deny the tagging of a pixel as an edge. This gate can selectively exclude edges that are currently marked at location where the gating function prohibited them. The gating function only provides a prohibiting effect; it can never cause a pixel to be marked as an edge if the AAT algorithm it is used in conjunction with doesn't detect an edge at that pixel.

There are several possible candidates for the gating function. One of the simplest is to use a random number generator and compare the result to a threshold. For example, if we wish to allow marking of 45% of all detected edges a random number from 0 to 1 can be generated at each location and those whose value exceed 0.55 (1−0.45) can be locations where edges are allowed. The advantage of this strategy is that the gating function created works for edges of all directions, since there is no preferred direction with white noise. The problem is that the gating function is "clumpy" in places since white noise has low frequency components. There may be several places along a boundary where several consecutive pixels are tagged as edges and other places along the same boundary where several consecutive pixels are not. This results poor edge rendering.

Additionally, if any 2D pattern is generated there will be edge orientations where the gating function fans. For example, if the gating function is a checkerboard pattern, any 45 degree edge will either be permitted or denied at all points along the border, negating the selectivity power of the gate function.

FIG. 4 illustrates a diagram of simple gating functions 40 that permit edges on every other scanline as shown at block 42 and every other pixel as shown at block 44, in accordance with a preferred embodiment. For simplicity and usefulness, two types of gating functions can be created: those that are functions of the pixel number or cross process location on the page and those that are function of the scanline number or process location on the page. As an example, a gating function can be created that permits edges every other scanline. The simple gating functions 42, 44 shown in FIG. 4 allow edges to be placed (whenever the function is "1") on either every other scanline (i.e., block 42) or every other pixel (i.e., block 44).

Figure 5:
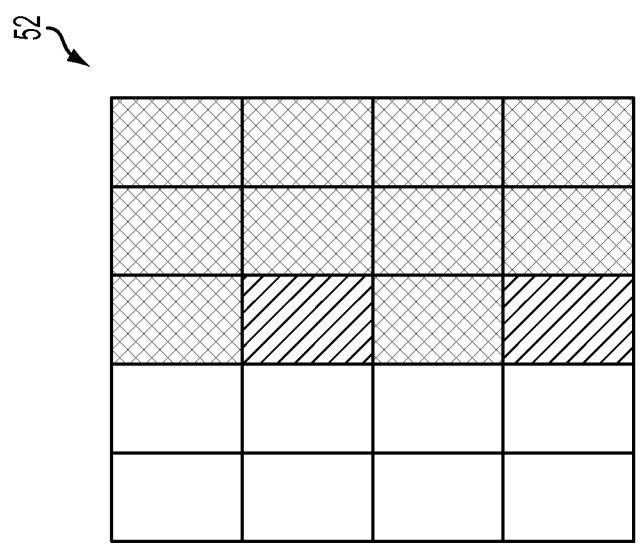
FIG. 5 illustrates a tagged image and an edge rendered—gray image, in accordance with an alternative embodiment.
Figure 5:
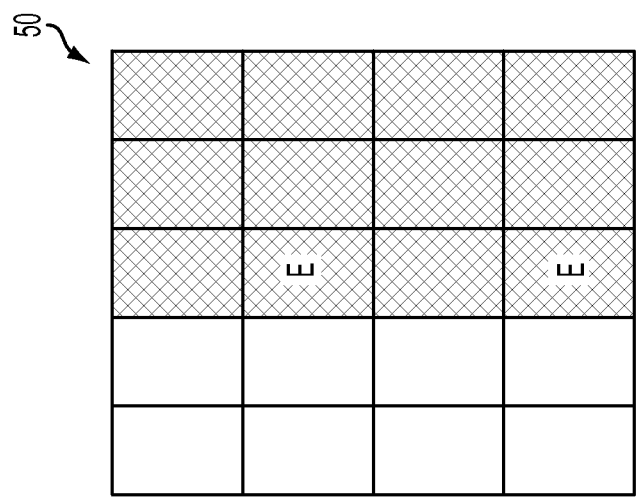

If the gating function of block 42, for example, is combined (overlayed) with the tagged function of the tagged image 34 shown in FIG. 3, the resultant tag map is a gray rendered image is as shown in FIG. 5. That is, FIG. 5 illustrates a tagged image 50 and an edge rendered—gray image 52, in accordance with an alternative embodiment.

In this instance, only two of the edge pixels are guaranteed to turn on and the halftoner will decide the bit outputs of the border pixels of the line not marked using an edge tag. This results in being able to place an outline on a character boundary that is controllable and allowing the halftoner to render the rest of the character.

Additionally, it would be trivial to create a gating function that allows edges only every three scanlines. This would weaken the edge outline function without any parameter changes to the AAT processing module or the AAR halftoning module. The advantage of having the ability to control the amount of outlining without having to reprogram the complex AAT/AAR modules in systems that already have them is of great benefit.

Note that in order to be able to dither the edge tagging of the edge in image 32 in FIG. 3, it is necessary to use the gating function of block 42 of FIG. 4. If the gating function of block 44 of FIG. 4 had been used, no dithering of the edge tagging would have occurred. Additionally, if the original edge was shifted one pixel to the left or right and the gating function of block 44 is used, no edge would be detected. In general, if the direction of variation of the gating function is parallel to the direction of the edge, the gating function fails to provide the desired result. From the original image 32 of FIG. 3, one can see that the edge gradient is from left-right and from block 44, the gating function varies in value when going left-right. The similar direction of gating and edge gradient result in the failure case just described.

Ideally, the gradient of the gating function should be orthogonal to the gradient of the image edge. In practice, any edge within 45 degrees of the orthogonal vector to the edge orientation works fine; this allows the full space of edges be effectively controlled by just the two types of gating functions (pixel varying and scanline varying) discussed earlier. Each detected edge type must be associated with a given gate function since no single gate function can work for all edge types. For example, left-right edges of the original image 32 of FIG. 3 must be controlled by gating functions that vary with scanline number, such as that of block 44 shown in FIG. 4. Conversely, all top-bottom must be controlled by gating functions that vary with pixel number, such as the one in block 44 of FIG. 4. Edges near 45 degrees can be effectively dithered using either gating function.

Another significant advantage of the gating function approach described herein is that different gating function can be used to compensate for asymmetries in the printing process. In certain xerographic systems, the edges of white to gray transitions from top to bottom are known to render much lighter than the transitions of gray to white in the same direction. This xerographic asymmetry results in trail edges that are much more pronounced (i.e., stronger) than lead edges. In order to compensate for this, the weak lead edge tagging can be associated with a gating function that is "on" (or permits edge tagging) significantly more than the gating function associated with trail edges. This will result in greater outlining of lead edges than trail edges, overcoming some of the inherent trail edge enhancement the xerography provides.

Although blocks 42 and 44 of FIG. 4 show simple gating functions (every other line/pixel), more generalized gating can be created using counters in hardware that trigger with every M out of N pixels. The logic of the gate is, for example:

$$\text{Gate}(sl) = \{1 \text{ if } (sl*M) \text{modulo } N >= N-M\}$$

$$\{0 \text{ otherwise}\}$$

wherein sl is the scanline number. The above function is trivial in hardware (just flip flops and an adder/subtractor) as well as software, allowing the method to be easily implemented in either.

The disclosed approach offers a number of novel features. For example, a gating function can be provided, which is applicable to edge marking and in which is not based just on the image neighborhood and/or an input tag based approach. The gating functions described herein offer unique but simple gates that are functions of either just the pixel or scanline location. The discussed approach also associates different gating functions with different edge types. For example, horizontal gradients can be associated with scanline count gating functions, and vertical gradients associated with pixel count gating functions. Either case can apply to near 45 gradients or corners.

Another novel feature of the disclosed embodiments is that dithering proportions can control the outline strength. For modes where strong outlining is desired, M/N can be increased. Additionally, the disclosed embodiments allow for correcting native asymmetry by utilizing different dithering proportions. Gate functions associated with weakly rendered edges (e.g., lead edges) may have larger M/N ratios than those associated strongly rendered edges (e.g., trail edges) in the same direction.

Figure 6:
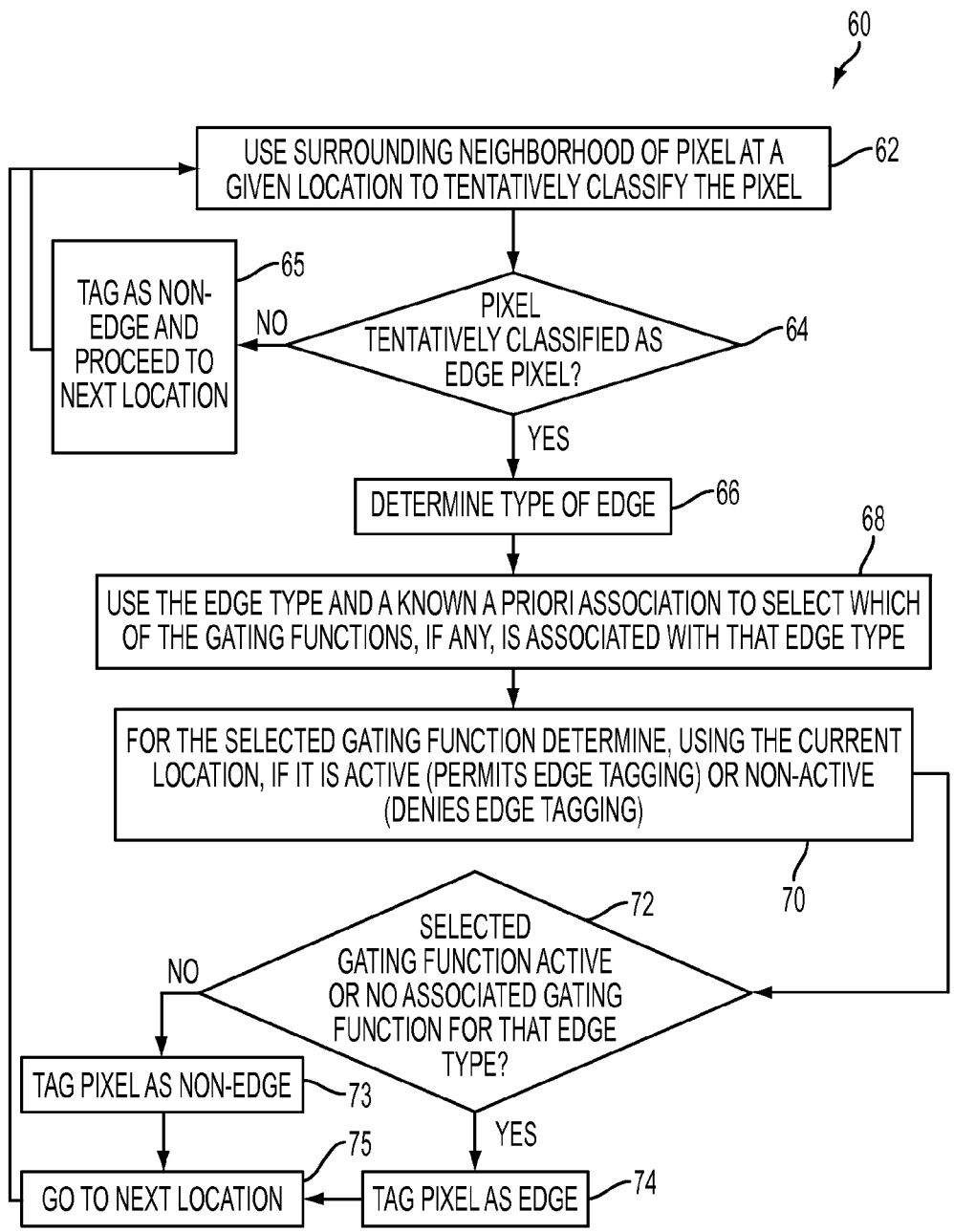
FIG. 6 illustrates a flow chart of operations depicting logical operational steps of a method for gated edge enhancement, in accordance with a preferred embodiment.

FIG. 6 illustrates a flow chart of operations depicting logical operational steps of a method 60 for gated edge enhancement, in accordance with a preferred embodiment. As shown at block 62, a step or logical operation can be implemented to use the surrounding neighborhood of the pixel at a given location to tentatively classify the pixel as either an edge pixel or a non-edge pixel. Then, as indicated at decision block 64, if the pixel is tentatively classified as an edge pixel, a determination can be made as to what type of edge it is, as illustrated at block 66. The process can then proceed to implementing the operation depicted at block 68. If, however, it is not tentatively classified as an edge pixel, then it can be tagged as "non-edge" as illustrated at block 65, and then the operations can proceed to the next location, following by processing again of the operation depicted at block 62.

The operation depicted at block 68 involves using the edge type and a known a priori association to select which of the gating functions, if any, is associated with that edge type. Thereafter, as described at block 70, a determination can be made for the selected gating function using the current location (e.g., scanline and cross process number), if it is active (permits edge tagging) or non-active (denies edge tagging). Thereafter, as shown at decision block 72, if the selected gating function is active or there is no associated gating function for that edge type, the pixel can be tagged as "edge," as depicted at block 74. If the selected gating function is NOT active, the pixel can be tagged as "non-edge" as shown at block 73. An operation can then be implemented to go the next location as indicated at block 75 and then jump back to processing of the operation illustrated at block 62.

Note that the operations of method 60 shown in FIG. 6 can be summarized as follows:

1) Use the surrounding neighborhood of the pixel at a given location to tentatively classify the pixel as either an edge pixel or a non-edge pixel;
2) If the pixel is tentatively classified as an edge pixel, determine what type of edge it is (and proceed to step (3)). If it is not tentatively classified as an edge pixel, then tag as non-edge, proceed to the next location, and return to step (1);
3) Use the edge type and a known a priori association to select which of the gating functions, if any, is associated with that edge type;
4) For the selected gating function determine, using the current location (scanline and cross process number—as discussed above), if it is active (e.g., permits edge tagging) or non-active (e.g., denies edge tagging);
5) If the selected gating function is active or there is no associated gating function for that edge type, tag the pixel as edge. If the selected gating function is NOT active, tag the pixel as non-edge; and
6) go to the next location and return to (1).

The mapping between gating functions and edge types is static; it does not change unless new edge types are added or current edge types are modified. For example, an edge marked as type "left" will always use the first gating and an edge marked as type "top" will use the third gating function. The first and third gating functions (along with all other gating functions) each have theft own logic to determine, based on scanline number and cross process location number, whether they are active or not. The active state for all gating function changes as a function of location but the association of an edge type with a particular gate (as given in the example above) does not. Therefore a known mapping can be employed to associate each edge type with at most one gating function (It is also possible to have an edge type not be associated with any gating function).

Note the gating function logic can be programmed to be active with any rational duty cycle (e.g., they can be active M/N fraction of the time where M and N are integers (M<=N)). Alternatively, stochastic gating functions can also be created using a random number generator and a threshold level to determine the active state in place of the rational duty cycle scheme. The gating function methodology discussed herein can be incorporated with any existing or new edge detection scheme.

One of the advantages of the disclosed embodiments is that this approach can be employed to increase robustness as halftoning decisions are moved over a larger area (instead of within a single pixel). The disclosed embodiments can also be used with systems that do not have high addressability (e.g., inkjet). This approach is also very inexpensive to implement in either hardware or software, and is easily detectible due to regularized dither patterns.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the users computer and partly on a remote computer or entirely on the remote computer. In the latter scenario, the remote computer may be connected to a users computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
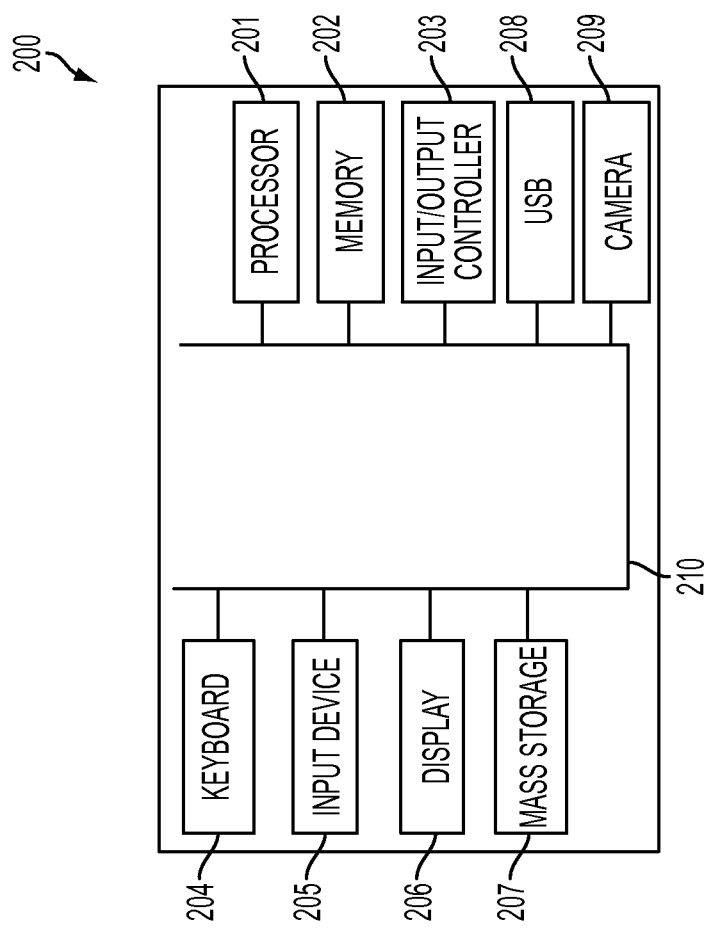
FIG. 7 illustrates a schematic view of a computer system, in accordance with an embodiment.
Figure 8:
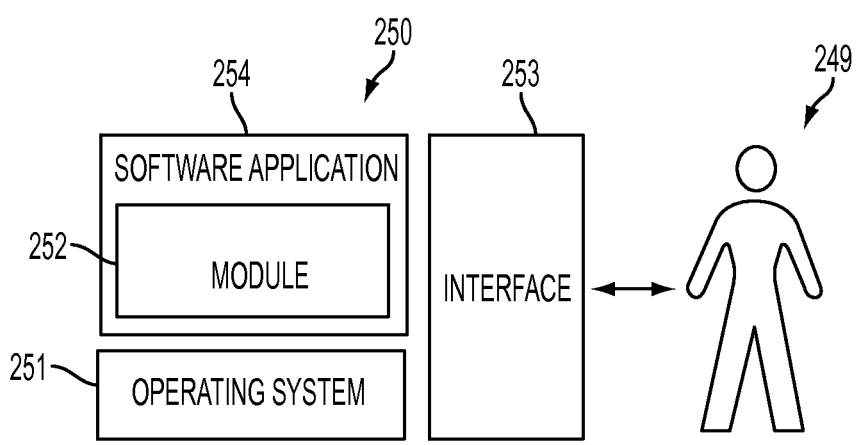
FIG. 8 illustrates a schematic view of a software system including a module, an operating system, and a user interface, in accordance with an embodiment.

FIGS. 7-8 are shown only as exemplary diagrams of data-processing environments in which embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device, such as a mouse, track ball, pen device, etc.), a display 206, and in some cases, mass storage 207. In some embodiments, an optional camera 209 may be included with system 200 to capture images, which may then be subject to the image processing module 130 of FIG. 2 and instructions such as those described and shown herein with respect to the method 60 of FIG. 6.

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device, and so on.

FIG. 8 illustrates a computer software system 250 for directing the operation of the data-processing system 200 depicted in FIG. 7. Software application 254, stored for example in memory 202, generally includes a kernel or operating system 251 and a shell or interface 253. One or more application programs, such as software application 254, may be "loaded" (i.e., transferred from, for example, mass storage 207 or other memory location into the memory 201) for execution by the data-processing system 200. The data-processing system 200 can receive user commands and data through the interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module(s) 252 that can, for example, implement instructions or operations such as those shown in FIG. 6. In some embodiments, module 252 may function as or in place of the image processing module 130 shown in FIG. 2.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein For example, in one embodiment, a method can be implemented for gated edge enhancement. Such a method can include, for example, steps or logical operations for generating a plurality of gating functions comprising mappings with respect to a position of an image; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determines an edge pixel as a function of both the video and a spatial location.

In another embodiment, determining each gate output with respect to the gating function(s) can further include steps or logical operations for determining each gate output with respect to the gating function(s) using an image pixel count. In still another embodiment, determining each gate output with respect to the gating function(s) can further involve steps or logical operations for determining each gate output with respect to the gating function(s) using an image scanline count.

In yet another embodiment, associating varying gating functions among the gating functions with different edge types can further involve steps or logical operations for associating horizontal gradients with scanline count gating functions among the gating functions; and associating vertical gradients with pixel count gating functions among the gating functions.

In some embodiments, a step or logical operation can be provided for controlling outline strength with respect to the image via dithering proportions. In other embodiments, a step or logical operation can be implemented for correcting native asymmetry with respect to the image utilizing varying dithering proportions. In another embodiment, a step or logical operation can be provided for capturing the image prior to generating the gating functions comprising mappings with respect to the position of the image. In still another embodiment, a step or logical operation can be implemented for rendering the image via an image-rendering device. In yet another embodiment, a step or logical operation can be implemented for providing a gating function logic with respect to the gating function, wherein the gating function logic is programmable to be active with any rational duty cycle. In yet another embodiment, the gating function can be, for example, a stochastic gating function created via a random number generator and a threshold level to determine an active state in place of the rational duty cycle.

In another embodiment, a system for gated edge enhancement can be implemented. Such a system can include, for example, at least one processor; and a computer-usable medium embodying computer program code, the computer-usable medium capable of communicating with the processor(s), the computer program code comprising instructions executable by the processor(s) and configured, for example, for: generating a plurality of gating functions comprising mappings with respect to a position of an image; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determines an edge pixel as a function of both the video and a spatial location.

In another embodiment, a system for gated edge enhancement can be implemented, which includes, for example, an image-capturing unit; at least one processor that communicates with the image-capturing unit; and a computer-usable medium embodying computer program code, the computer-usable medium capable of communicating with the processor(s). The computer program code can include instructions executable by the processor(s) and configured for: generating a plurality of gating functions comprising mappings with respect to a position of an image captured by the image-capturing unit; marking edges at locations of the image wherein an associated gating function among the gating functions is active; tagging at least one pixel of the image as an edge pixel if an edge is detected and edge gating functions are active; determining each gate output with respect to the gating function(s) using an image pixel count or an image scanline count; and associating varying gating functions among the gating functions with different edge types to ensure that an edge modulation pattern occurs orthogonal to a direction of the edge and thereby determines an edge pixel as a function of both the video and a spatial location.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for gated edge enhancement, comprising:
generating a plurality of gating functions comprising mappings with respect to a position of an image;
marking edges at locations of said image wherein an associated gating function among said plurality of gating functions is active;
tagging at least one pixel of said image as an edge pixel if an edge is detected and edge gating functions are active;
determining each gate output with respect to said at least one gating function using an image pixel count or an image scanline count; and
associating varying gating functions among said plurality of gating functions with different edge types to ensure that an edge modulation pattern occurs orthogonal to a direction of said edge and thereby determines an edge pixel as a function of both said video and a spatial location.

2. The method of claim 1 wherein determining each gate output with respect to said at least one gating function further comprises:
determining each gate output with respect to said at least one gating function using an image pixel count.

3. The method of claim 1 wherein determining each gate output with respect to said at least one gating function further comprises:
determining each gate output with respect to said at least one gating function using an image scanline count.

4. The method of claim 1 wherein associating varying gating functions among said plurality of gating functions with different edge types, further comprises:
associating horizontal gradients with scanline count gating functions among said plurality of gating functions; and
associating vertical gradients with pixel count gating functions among said plurality of gating functions.

5. The method of claim 1 further comprising controlling outline strength with respect to said image via dithering proportions.

6. The method of claim 1 further comprising correcting native asymmetry with respect to said image utilizing varying dithering proportions.

7. The method of claim 1 further comprising:
capturing said image prior to generating said plurality of gating functions comprising mappings with respect to said position of said image.

8. The method of claim 1 further comprising rendering said image via an image-rendering device.

9. The method of claim 1 further comprising providing a gating function logic with respect to said gating function, wherein said gating function logic is programmable to be active with any rational duty cycle.

10. The method of claim 9 wherein said gating function comprises a stochastic gating function created via a random number generator and a threshold level to determine an active state in place of said rational duty cycle.

11. A system for gated edge enhancement, said system comprising:
at least one processor; and
a non-transitory computer-usable medium embodying computer program code, said computer-usable medium capable of communicating with said at least one processor, said computer program code comprising instructions executable by said at least one processor and configured for:
generating a plurality of gating functions comprising mappings with respect to a position of an image;
marking edges at locations of said image wherein an associated gating function among said plurality of gating functions is active;
tagging at least one pixel of said image as an edge pixel if an edge is detected and edge gating functions are active;
determining each gate output with respect to said at least one gating function using an image pixel count or an image scanline count; and
associating varying gating functions among said plurality of gating functions with different edge types to ensure that an edge modulation pattern occurs orthogonal to a direction of said edge and thereby determines an edge pixel as a function of both said video and a spatial location.

12. The system of claim 11 wherein said instructions are configured for determining each gate output with respect to said at least one gating function using an image pixel count.

13. The system of claim 11 wherein said instructions are further configured for determining each gate output with respect to said at least one gating function, further comprise instructions configured for determining each gate output with respect to said at least one gating function using an image scanline count.

14. The system of claim 11 wherein said instructions are further configured for:
associating horizontal gradients with scanline count gating functions among said plurality of gating functions; and
associating vertical gradients with pixel count gating functions among said plurality of gating functions.

15. The system of claim 11 wherein said instructions are further configured for controlling outline strength with respect to said image via dithering proportions.

16. The system of claim 11 wherein said instructions are further configured for correcting native asymmetry with respect to said image utilizing varying dithering proportions.

17. The system of claim 11 wherein said instructions are further configured for capturing said image prior to generating said plurality of gating functions comprising mappings with respect to said position of said image.

18. The system of claim 1 wherein said instructions are further configured for rendering said image via an image-rendering device.

19. The system of claim 1 wherein said instructions are further configured for providing a gating function logic with respect to said gating function, wherein said gating function logic is programmable to be active with any rational duty cycle, wherein said gating function comprises a stochastic gating function created via a random number generator and a threshold level to determine an active state in place of said rational duty cycle.

20. A system for gated edge enhancement, said system comprising:
- an image-capturing unit;
- at least one processor that communicates with said image-capturing unit; and
- a non-transitory computer-usable medium embodying computer program code, said computer-usable medium capable of communicating with said at least one processor, said computer program code comprising instructions executable by said at least one processor and configured for:
  - generating a plurality of gating functions comprising mappings with respect to a position of an image captured by said image-capturing unit;
  - marking edges at locations of said image wherein an associated gating function among said plurality of gating functions is active;
  - tagging at least one pixel of said image as an edge pixel if an edge is detected and edge gating functions are active;
  - determining each gate output with respect to said at least one gating function using an image pixel count or an image scanline count; and
  - associating varying gating functions among said plurality of gating functions with different edge types to ensure that an edge modulation pattern occurs orthogonal to a direction of said edge and thereby determines an edge pixel as a function of both said video and a spatial location.

* * * * *